J. A. OLBON.
TOILET MIRROR.
APPLICATION FILED MAR. 17, 1913.
1,105,039.
Patented July 28, 1914.
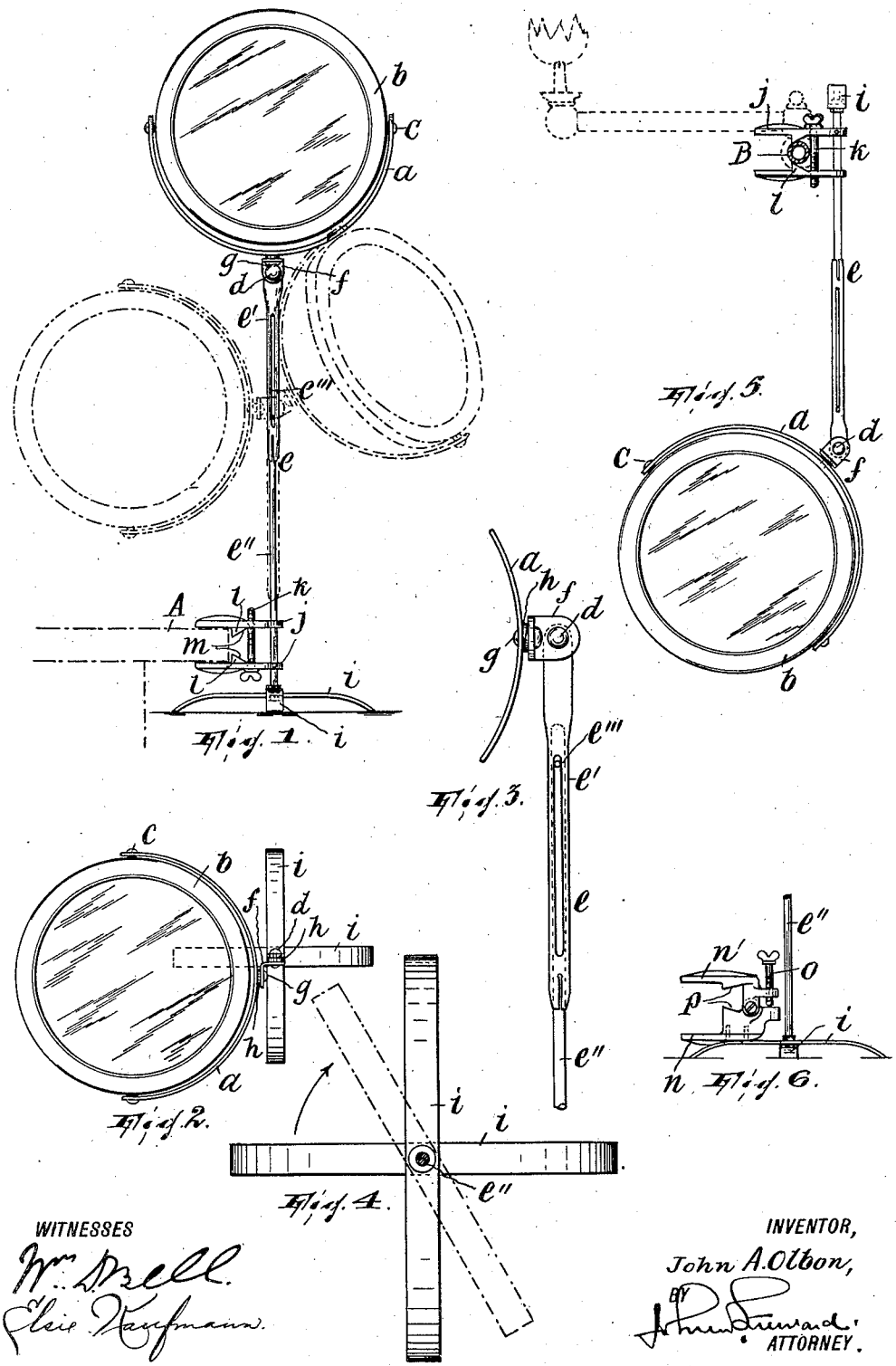
WITNESSES
INVENTOR,
John A. Olbon,
ATTORNEY.

UNITED STATES PATENT OFFICE.

JOHN A. OLBON, OF PATERSON, NEW JERSEY, ASSIGNOR TO FRANK E. REA, OF PATERSON, NEW JERSEY.

TOILET-MIRROR.

1,105,039.　　　Specification of Letters Patent.　　Patented July 28, 1914.

Application filed March 17, 1913. Serial No. 754,750.

*To all whom it may concern:*

Be it known that I, JOHN A. OLBON, a citizen of the United States, residing at Paterson, in the county of Passaic and State of New Jersey, have invented certain new and useful Improvements in Toilet-Mirrors, of which the following is a specification.

The object of this invention is to provide a toilet mirror of a novel construction permitting the device to be folded into small compass, so as to occupy little space in a valise or the like, and also be adapted to various types of means for supporting it and at the same time allow the mirror proper or glass to assume any position happening to be most convenient for any particular use to which the mirror may be put.

In the accompanying drawing, Figure 1 is a front elevation of the improved mirror; Fig. 2 is a plan view; Fig. 3 is a fragmentary front elevation on a larger scale; Fig. 4 is a plan view of the base; Fig. 5 shows the device attached to a gas fixture or the like; and, Fig. 6 is a fragmentary view illustrating a modification.

$a$ is a semi-circular bracket in which is pivoted on a diametrical axis the mirror-proper or glass $b$, the pivots being screws or the like $c$. On a horizontal rivet or the like $d$ in the upper end of a substantially straight support $e$ (to be described in detail) is pivoted one arm of an L-shaped joint member $f$, to the other arm of which, on a rivet $g$ or the like arranged at right angles to the rivet $d$, is pivoted the bracket $a$, the rivet $g$ penetrating bracket $a$ substantially midway between the ends thereof. Spring washers $h$ may be employed to resist the pivotal movement of member $f$ on the support and the bracket on member $f$, so that the parts will remain in any position to which they are pivotally adjusted. On account of the employment of the angular joint member $f$ pivotally connecting the bracket with the support, and of the pivoting of the mirror in the bracket the mirror can be moved from the completely folded or compact relation to the support (that is, hanging pendant therefrom and in flatwise relation thereto) to any position or angle, such as for instance, those shown in Fig. 1.

The support $e$ is telescopic so that the device can be extended to bring the mirror to any elevation. The tubular part $e'$ of the support $e$ has its lower end split as shown in Fig. 3 and somewhat contracted so as to grip the other or received part $e''$. To retain the parts $e'$ and $e''$ against separation they may have the longitudinal slot and pin connection $e'''$. Swiveled to the lower end of the member $e''$ are the base members $i$. When these stand in the crossing relation shown in Fig. 4 they form a suitable base by which the device can stand on a table or the like; when they are turned on the member $e''$ as an axis so as to overlap each other from end to end they may be brought into a plane parallel with that of the mirror when in the completely folded position, to give the device the desired flat form for packing.

As it may not always be convenient to stand the device on a table or the like, I provide means for clamping it to a table edge or some other projecting support, such as for instance a gas fixture. In Figs. 1 and 5, the clamp comprises two clips $j$ $j$ each of which is penetrated by the member $e''$ of the support, one of the clips being penetrated freely by a thumb screw $k$ which is tapped into the other clip. By manipulating the screw $k$ the clips can be made to grip a table edge A. The clips have oppositely inwardly projecting jaws or lugs $l$ whose inner surfaces $m$ converge away from the screw $k$. These jaws afford means whereby the clips may be made effectively to grip the pipe B of a gas fixture or the like (Fig. 5). Or the clamp may take the form shown in Fig. 6, where one clip $n$ is rigidly secured to a part of the device and the other $n'$ is pivoted to the first clip, $o$ being a thumb screw tapped in one member and bearing against the other and serving to produce their gripping action.

$p$ are jaws on the clips corresponding in form and function to the jaws $l$ already described.

In Fig. 5 the screw $k$ forms, and in Fig. 6 the jaw $n'$ itself affords, abutment means to coöperate with the converging surfaces to grip the pipe B or the like.

Having thus fully described my invention, what I claim as new and desire to secure by Letters Patent is:—

In combination, a support, a mirror, means for securing the mirror to the support and a two-jawed clamp attached to the support and having abutment means between its jaw-portions and opposite gripping surfaces on said jaw portions converging away from the abutment means and coactive therewith to hold or grip a pipe or the like, substantially as described.

In testimony whereof I affix my signature in presence of two witnesses.

JOHN A. OLBON.

Witnesses:
 JOHN W. STEWART,
 WM. D. BELL.